Oct. 14, 1930. L. W. BOWEN 1,778,351
MOTION PICTURE APPARATUS
Filed Sept. 16, 1926 4 Sheets-Sheet 2
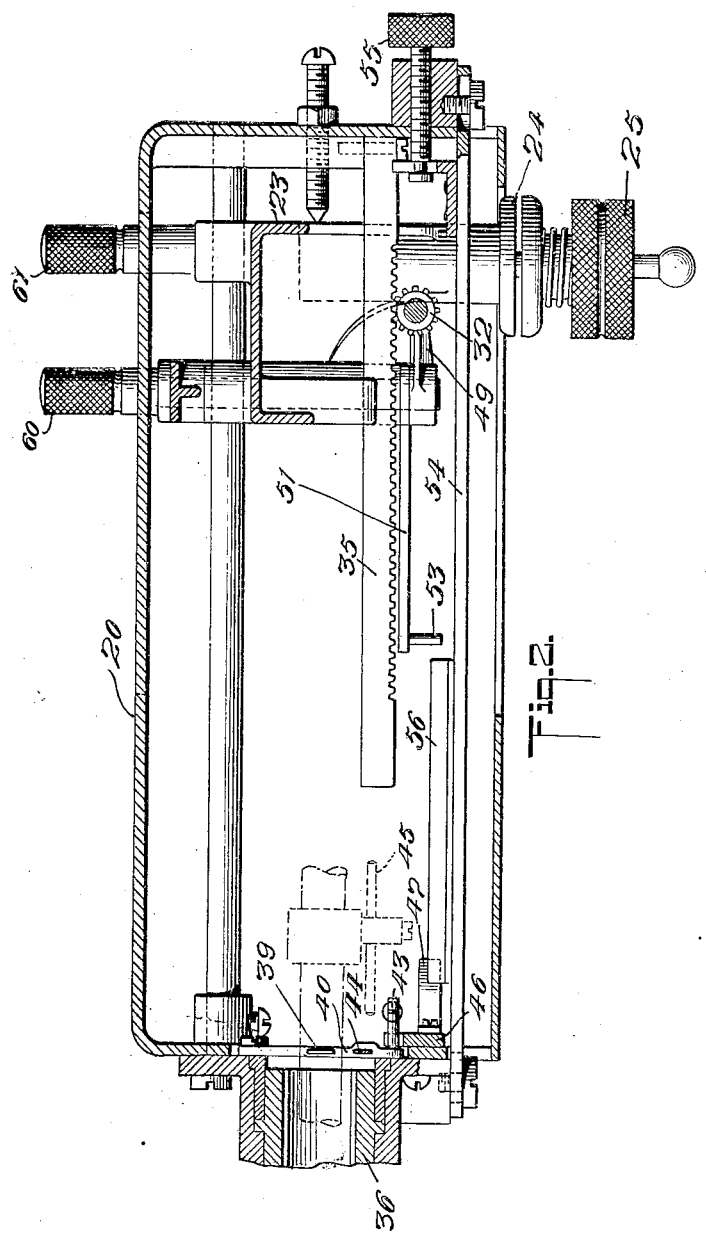
INVENTOR
LESTER W. BOWEN
by his attorneys
Howson and Howson

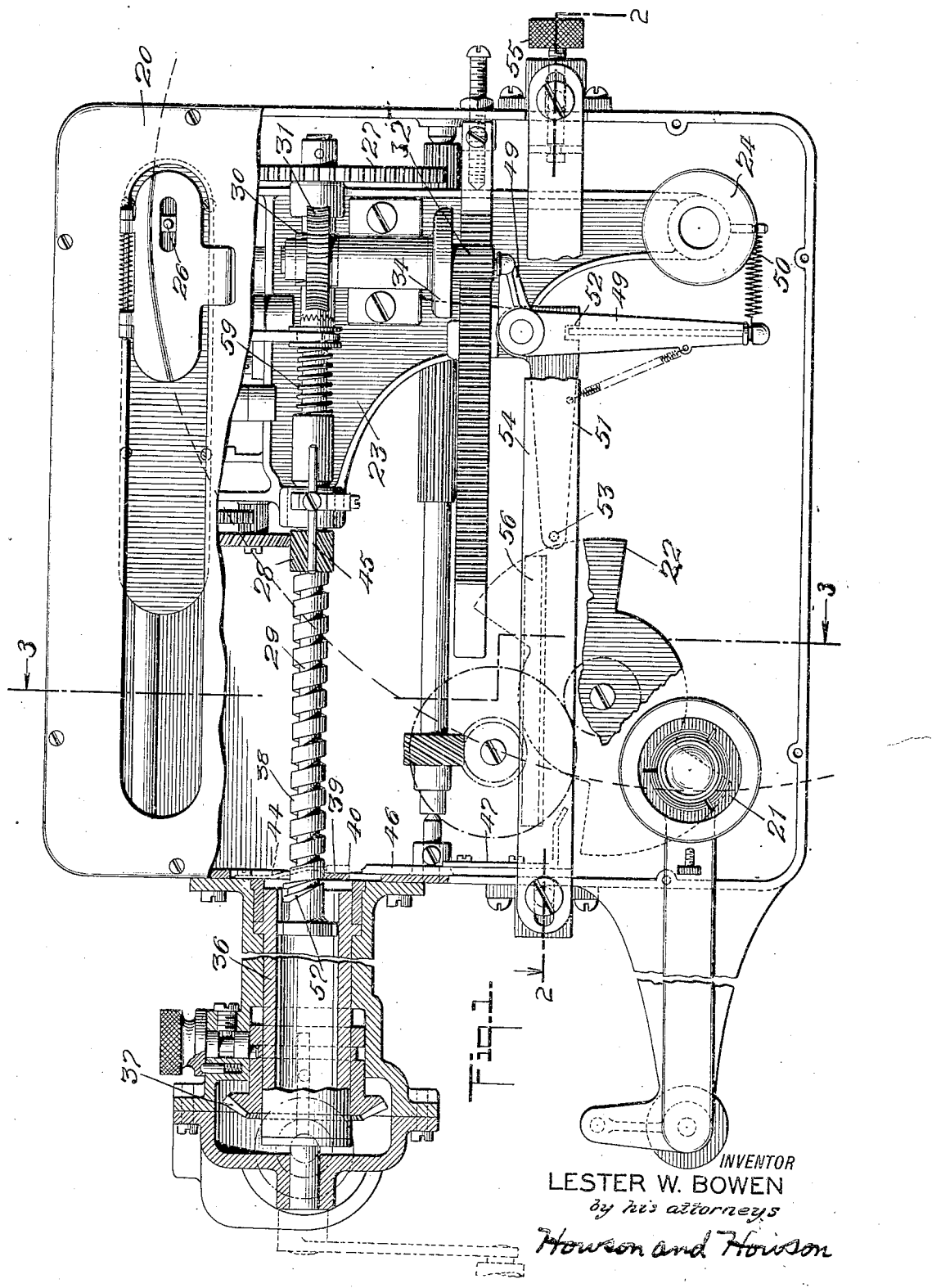

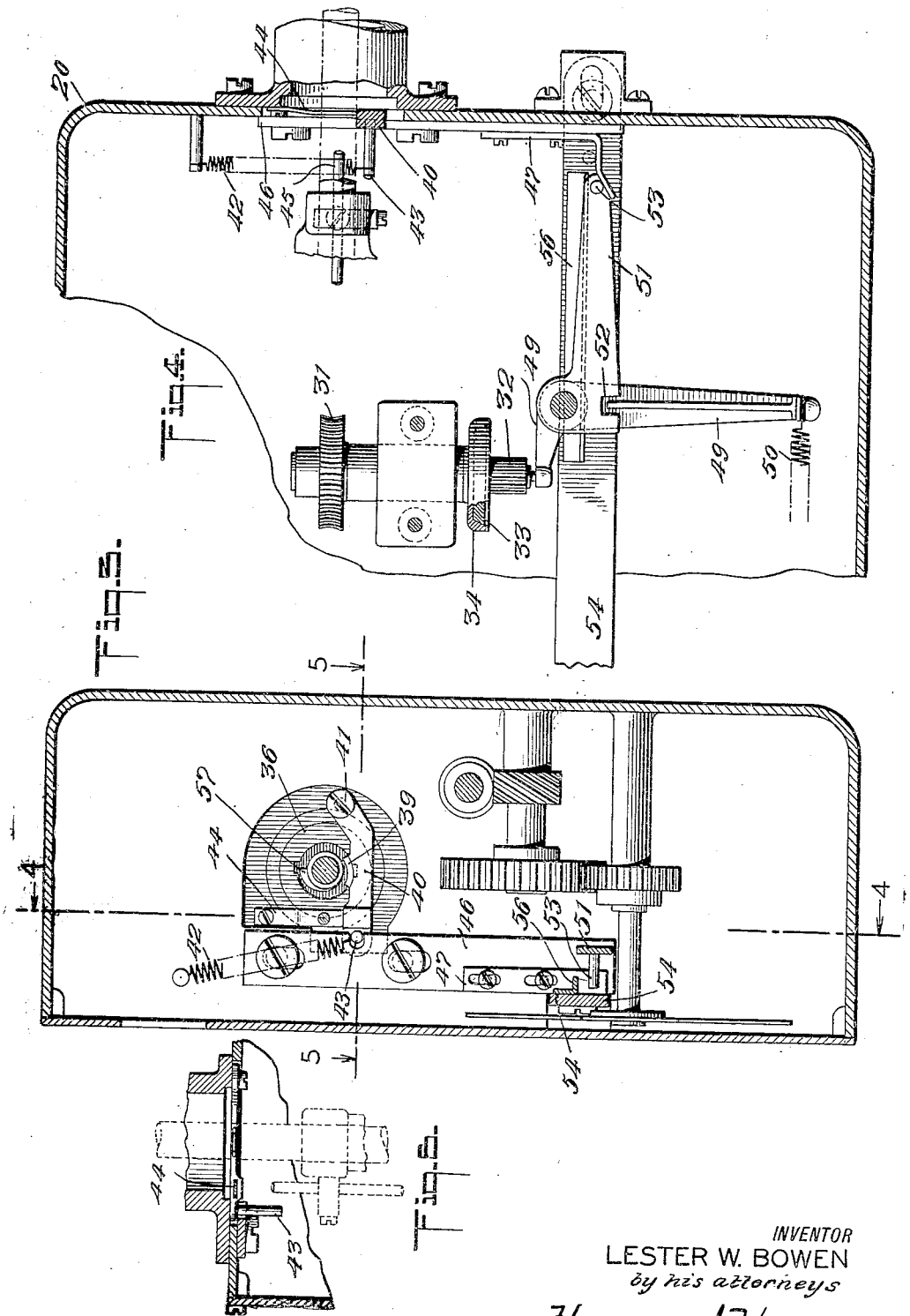

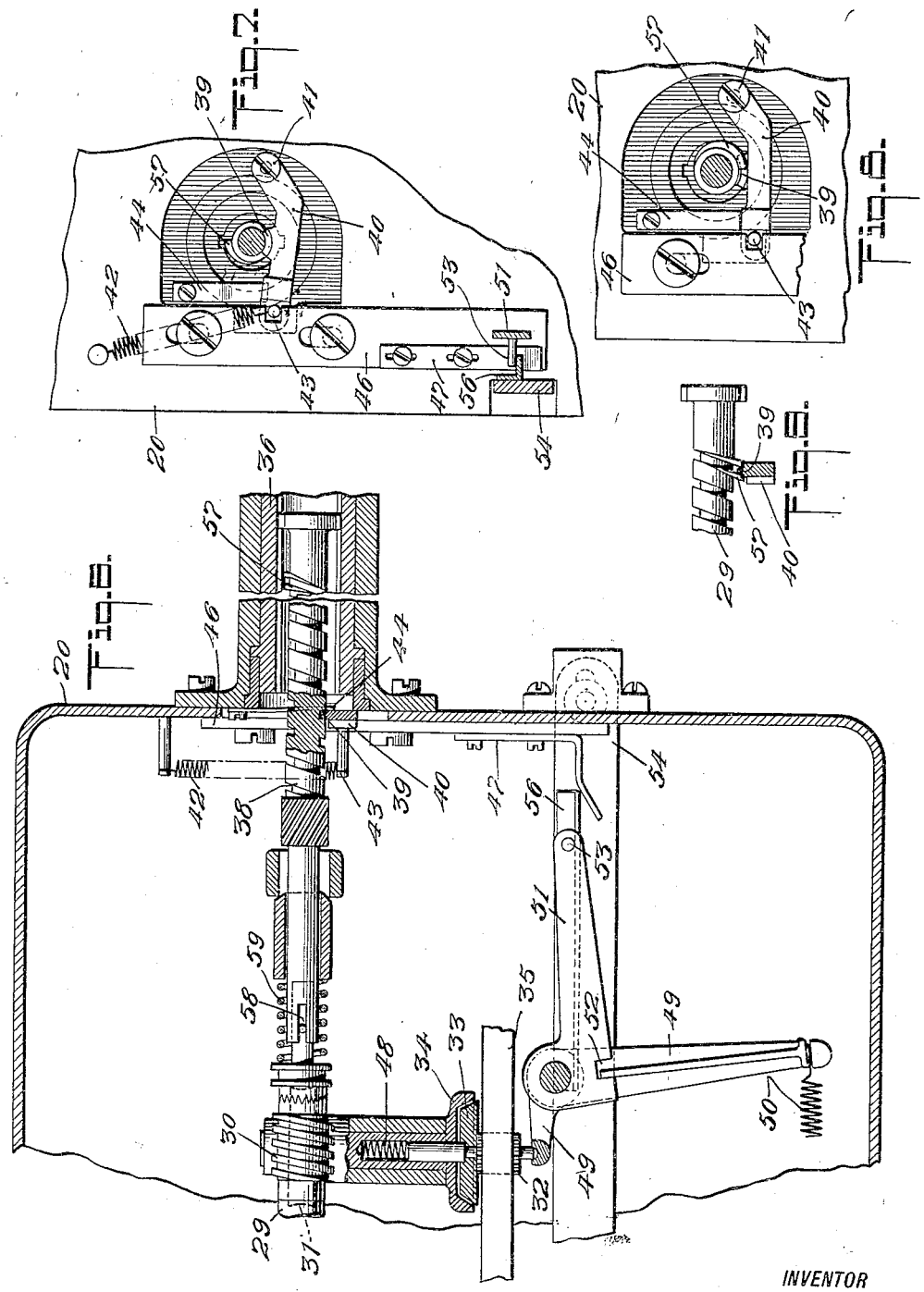

Patented Oct. 14, 1930

1,778,351

UNITED STATES PATENT OFFICE

LESTER W. BOWEN, OF HASBROUCK HEIGHTS, NEW JERSEY, ASSIGNOR TO SPIRO FILM CORPORATION, OF IRVINGTON-ON-HUDSON, NEW YORK, A CORPORATION OF DELAWARE

MOTION-PICTURE APPARATUS

Application filed September 16, 1926. Serial No. 135,392.

My invention relates to motion picture apparatus and more particularly to apparatus wherein the series of pictures is arranged spirally and/or radially on a transparent plate or disc-film, (hereinafter referred to as a film), said film having a rectilinear and an intermittent rotary movement.

One object of my invention is to provide means whereby a series of pictures arranged spirally and/or radially upon a disc-film may be repeatedly projected without attention or adjustment by the operator. A further object of my invention is automatically to return to starting position a film-carrying carriage without stopping the intermittent rotary motion of the film. Other objects will appear upon consideration of this specification.

According to my invention the film is rotatably mounted upon a carriage, which has a rectilinear movement in a plane at right angles to the machine's axis of projection. Intermittent rotary movement is given the film by any convenient means, for instance by a mechanism such as that described in Patent No. 1,254,239 granted January 22, 1918 to F. E. Koella or Patent No. 1,582,032 granted April 27, 1926 to P. S. Gauriat. It is noted that the apparatus disclosed in this latter patent might be used for rotating a disc film.

I also provide a novel repeat motion whereby continued operation of the driving mechanism in one direction not only advances the carriage, but is made to return it to its original position automatically after a complete film has been projected.

It is obvious that my invention may be applied either to a projection machine or, (where the film is changed between one forward motion and the next) to a camera machine. For simplicity of description, however, the embodiment shown and described is a projection machine.

In the drawings—

Figure 1 is a front elevation, partly broken away and partly in section, of a motion picture projection machine constructed in accordance with my invention;

Fig. 2 is a horizontal section taken on the line 2—2 of Fig. 1;

Fig. 3 is a vertical section taken on the line 3—3 of Fig. 1;

Fig. 4 is a vertical section, partly broken away, on the line 4—4 of Fig. 3;

Fig. 5 is a horizontal detailed section on the line 5—5 of Fig. 3 showing the automatic reversing prong;

Fig. 6 is a sectional elevation showing the relation of the parts when the mechanism is being reversed;

Fig. 7 is a view in elevation showing the position of the automatic reversing prong and the parts which control its action when the mechanism is being returned to starting position;

Fig. 8 is a fragmental view in elevation showing the automatic means employed for throwing the reversing prong out of engagement; and Fig. 9 is a side elevation illustrating how the reversing prong is disengaged at the end of the reversing movement.

In the embodiment illustrated, a casing 20 has mounted at the rear thereof a projecting lantern (lantern not shown) which directs its light through the casing, and through the film and lens 21 on the front side of the casing. (The film is not shown.) In the path of light projected by the lantern revolves the usual shutter 22.

A carriage 23 is slidably mounted within the casing, and it is upon this carriage that the film is carried and rotated.

The film is rotatably and loosely held against a circular flat plate 24 which is part of the carriage 23, by any convenient means, for instance by a pin 25 such as that described in United States Letters Patent No. 1,124,621 to Henry W. Joy.

Intermittent rotary motion is given the film by any desired means, mounted upon the carriage. A gear 27 mounted upon and operated by a shaft 29 serves to actuate the film rotating mechanism.

If rotary motion alone were given the film the projection would only trace the path of a circle upon the film. The series of pictures being photographed upon the film in the form of a spiral, it is necessary that rectilinear as well as rotary motion be given the film in order that the projection of light may trace a spiral path upon the rotating film.

Rectilinear motion is given the carriage (and with it the film) from the shaft 29 which rotates a worm 30, mounted upon the shaft. The worm 30 meshes with a gear wheel 31, which in turn drives a pinion 32 through a clutch 33, 34. The pinion 32 meshes with a rack 35, which is fixed to the casing 20. Thus by rotating the shaft 29 the pinion 32 is caused to travel along the rack 35 and, being journaled upon the carriage, gives the carriage rectilinear motion.

The shaft 29 is driven through slidable connection with a driving sleeve 36, which may be operated by a motor (not shown) through a bevel gear 37. The sleeve 36 may be operated by a hand crank as well.

I also provide means for causing the continued rotation of the shaft 29 to reverse the travel of the carriage 23. This means consists of a spiral thread 38 upon the shaft 29, to the left of the worm 30 when viewed as in Fig. 1, a prong 39 slidable vertically in the casing and adapted automatically to engage the spiral thread, and means for disconnecting the pinion 32 from the train of gears giving it forward motion. The pitch of the spiral thread is adapted to give the carriage a return movement upon engagement with the prong.

The prong 39 is carried by a lever 40 which is pivoted at one end to the casing by a screw 41, and is stressed by a spring 42, which tends to pull the prong into engagement with the helical thread 38. The spring 42 is connected to the free end of a lever 40 through a pin 43 and at its other end to the casing. The prong is normally held down out of engagement with the helical tooth 38, by a leaf spring 44 which bears on top of the lever 40. An adjustable pin 45 is carried by the carriage, in such position that its end will contact with the leaf spring 44 as the carriage reaches the end of its forward travel. At such a moment the leaf spring is pushed out of contact with the lever 40 and the prong 39 is snapped into engagement with the helical tooth 38.

Slidable connection between the shaft 29 and the sleeve 36 permits the recession of the shaft within the sleeve when forward motion is given the carriage and the withdrawal of the shaft from the sleeve as the prong and the helical tooth interact. Thus the carriage is returned to starting position after it has completed its forward travel.

In order to return the prong 39 and the lever 40 to normal position (and with them the plate 46 and the angle piece 47) at the completion of the reverse motion of the carriage, I provide, near the end of the shaft 29 which engages with the sleeve 36, a cam 57. As the shaft rotates with the carriage substantially in starting position, the cam 57 depresses the prong 39 and with it the lever 40 until the leaf spring 44 snaps into position on top of the lever. Thus the prong is held down out of engagement with the helical tooth. This action is best illustrated in Figs. 7, 8 and 9.

Slidably mounted in the casing 20, in substantially the same plane as the prong 39 and the lever 40, is a plate 46. This plate is so constructed as to engage with the pin 43 and to be lifted vertically by its motion when the spring 42 raises the lever 40. Attached to the inner face of the plate 46 in a vertical position is an angle piece 47. The lower end of the angle piece is bent in a horizontal right angle inwardly of the casing and the extreme end is again bent slightly downward. The purpose of the slidable plate 46 and the angle piece 47 will be explained presently.

It would be impossible to move the carriage in reverse direction unless the pinion wheel 32 were thrown out of engagement with the gear wheel 31, which revolves continuously with the shaft 29. I therefore provide means adapted to disconnect the last member of the train of gears which drives the carriage in a forward direction. This means will now be described.

There is a spring 48 acting through the upper member 34 of the clutch 33, 34 tending to withdraw the lower member 33 from the upper member 34. This action is resisted, and the members of the clutch are held together by the action of a bell-crank lever 49, the upper arm of which bears against a projecting lower axle extension of the pinion wheel 32, under the stress of a tension spring 50 stretched between the end of the lower arm of the bell crank lever and the carriage. The strength of the spring 50 is sufficient to overcome the action of the spring 48 and when no other forces are applied will hold the parts 33 and 34 together. Mounted on the same shaft as the bell-crank lever 49 is a second lever 51, which has a recess 52 whose shoulders loosely engage a longitudinal rib on one arm of the bell-crank lever. At the end of the second lever 51 remote from the recess 52 and projecting horizontally at right angles to the lever is a pin 53 whose function will be explained presently.

Attached to the casing beneath the rack 35 and extending horizontally is a strip 54, preferably of metal, which is longitudinally adjustable by means of a screw 55. This screw 55 adjusts the length of travel of the carriage, as will be shown when the operation of the apparatus is described. Fastened to the strip 54 and extending horizontally is a small angle iron 56 in a position just above the slightly inclined end of the angle piece 47.

The pin 53 projects beneath this angle iron 56 when the carriage is moving forward, and the angle iron acts as a track for the pin 53 when the carriage is coming back.

As it is necessary to revolve the shaft, with the prong and helical thread in engagement until contact with the cam 57 automatically ends the reversing action, and as the distance which the carriage travels on the return movement may be limited by the screw 55, I provide means for permitting the carriage to halt before the cam 57 has reached the prong 39. This means may take the form, here illustrated, of a hollow shaft and a solid shaft slidable therein. As shown, a groove and pin connection 58 (see Fig. 6) causes the two parts of the shaft 29 to revolve together, while being longitudinally extensible and retractable. A spring 59 keeps them extended as far as the rigid parts of the machine will permit.

The operation of the forward and reverse motion is as follows:

The machine being in starting position as shown in Fig. 1, the sleeve 36 is rotated (by motor or by hand) in a clockwise direction when viewed from the left. In consequence the shaft 29, also revolves in a clockwise direction actuating the shutter by means of the gear wheel 27 and a train of gears operably associated therewith, and also actuating the rotating mechanism by means of the gear 27 and its connections. The worm wheel 30 is turned at the same time, causing the gear wheel 31 to revolve. The clutch elements 33 and 34 being in engagement with the pinion wheel 32, the action of the pinion wheel 32 with the stationary rack 35 moves the carriage 23 to the left as viewed in Fig. 1, the shaft 29 sliding to the left within the sleeve 36.

During this forward motion the bell-crank lever 49 bears upward upon the under side of the pinion wheel 32, keeping the clutch elements 33, 34 constantly in contact. At the same time the pin 53 at the end of the lever 51 passes beneath the projecting flange of the angle iron 56. As the carriage 23 reaches the wall of the casing 20, which is shown at the left in Fig. 1, two things occur: The pin 53 rides up upon the extreme end of the angle piece 47 which is bent slightly downward, and slides along the horizontal surface of the lower end. At the same time the adjustable pin 45 comes in contact with the spring 44 and pushes it from its restraining position on top of the lever 40. As a result of this action the spring 42 raises lever 40 and with it the prong 39, which comes into cooperating connection with the helical thread 38. At the same time the spring 42 raises the plate 46 vertically. The angle piece 47 being attached to the plate 46 is simultaneously raised and with it the pin 53 and the end of the lever 51.

As the end of the lever 51 is raised a shoulder of the recess 52 bears upon the longitudinal rib of the bell-crank lever 49, turning the bell-crank lever against the operation of the spring 50 and away from the pinion wheel 32. The spring 48 thereupon separates the clutch elements 33, 34 and the pinion wheel 32 is permitted to idle. The carriage 23 is thus in condition to be moved rearwardly by the interaction of the prong 39 and helical thread 38.

The helical thread 38, now being in engagement with the prong 39 proceeds to bear against it in a direction to the left as viewed in Fig. 1 and, as will be readily seen, this action is continued as long as the shaft 29 revolves in a clockwise direction as viewed from the left and the prong and helical thread continue in operative association.

The rotary movement of the film continues during the reverse motion.

When the pin 53 reaches the end of the angular piece 56 it drops back to its former position because of the action of the spring 50 upon the bell-crank lever 49, and the bell-crank lever 49 thereupon bears against the lower end of the pinion wheel 32 causing the clutch elements to engage and the rearward motion of the carriage 23 to be halted.

The shaft 29 continues to rotate with the helical thread 38 bearing against the prong 39, the play of the shaft being taken up by a sliding of the pin and groove connection 58 (see Fig. 6) and being resisted by the spring 59. This action continues for a very short time while the shaft 29 slides out of the sleeve 36 until the cam 57 acts upon the prong 39. The action of the cam 57 depresses the prong 39, and with it the lever 40, until a position is assumed wherein the leaf spring 47 may snap back into its restraining position on top of the lever 40. The shaft continues to revolve and the cam 57 passes clear of the prong 39, whereupon the spring 59 snaps the shaft back into its original position.

When the cam 57 depresses the prong 39 and the lever 40, the pin 43 is of course also depressed against the action of the spring 42. With the pin 43 is moved the plate 46 and the angle piece 47, both being returned to their original positions.

The carriage has now gone through a complete cycle and is in a position to repeat the movement.

It will be noted that the strip 54 is slidably mounted upon the casing and the screw 55 is designed to move the strip either to the right or to the left as viewed in Fig. 1. The angle iron 56 being rigid with the strip 54 is of necessity moved with it. By turning the screw 55, the position of the angle iron 56 is therefore determined and the position of the angle iron determines the point at which the pin 53 drops and the clutch 33, 34 is in consequence engaged, halting the rearward action of the carriage 23. It is thus seen that by means of the screw 55 the length of travel of the carriage may be regulated.

The reverse motion must take place in one or more completed revolutions of the film, and is designed to have completed the operation when the initial title is brought before the projecting lantern. There being twelve complete turns in the spiral on the film the rate of reverse linear speed to forward linear speed is 12 to 1. This action causes the pictures to appear on the screen in processional form during the reverse motion.

The apparatus is also designed to be returned by hand and for this purpose two handles 60 and 61 are provided. The handle 60, when stressed in a direction toward the handle 61 stresses the bell crank lever 49 and the lever 51, thus disengaging the clutch 33—34. The carriage is then slid back to starting position.

Various modifications in the details of construction and the arrangement of parts will readily occur to those dealing with the problem without departing from what I claim as my invention.

I claim—

1. In a motion picture apparatus, a casing, a carriage mounted within said casing for rotatably supporting a disc-film, a driving sleeve journaled within said casing and a spirally threaded shaft having slidable connection with said driving sleeve adapted to coact with a train of gears to transmit rotary motion to the disc-film and adapted to coact with a second train of gears coacting with a rack on said casing to transmit rectilinear motion to said carriage, in combination with a prong associated with the casing and engageable with said shaft for reversing the rectilinear motion of the carriage without reversing the direction of rotation of the shaft.

2. In a motion picture apparatus, a rigid frame, a carriage slidable upon said frame for carrying a disc-film, a train of gears mounted on said carriage and driven by a shaft, and a rack rigid with said frame with which a member of said train of gears engages, in combination with a clutch, a spring-restrained lever holding the members of said clutch in engagement, a track onto which an end of said lever may slide holding the clutch members disengaged, and an angle piece adapted to lift said lever end to the level of said track when forward motion of the carriage has been completed.

3. In a motion picture apparatus, a rigid frame, a carriage slidable upon said frame for carrying a disc-film, a driving sleeve journaled upon said frame, a rotatable spirally-threaded shaft having slidable connection with said driving sleeve adapted to transmit rectilinear motion to said carriage, and a prong associated with the casing and engageable with said shaft for reversing the rectilinear motion of the carriage, without reversing the direction of rotation of the shaft, in combination with a train of gears mounted on said carriage and driven by said shaft, a rack rigid with said frame with which a member of said train of gears engages, a clutch, a spring-restrained lever, and a track onto which said lever may slide, said clutch, lever and track being adapted to hold in disconnected relation the last member of said train of gears from the others when the carriage motion is reversed.

4. In a motion picture apparatus, a rigid frame, a shaft associated with said frame, a carriage slidable upon said frame for carrying a disc-film, a train of gears mounted on said carriage and driven by said shaft, and a rack rigid with said frame with which a member of said train of gears engages, in combination with a clutch, a spring-restrained lever, and a track onto which said lever may slide, the lever being adapted to engage said clutch when it falls off said track, and the length of said track being adapted to drop the lever off the track's end when starting position has been reached by the carriage, substantially as described.

5. In a motion picture apparatus, a casing, a carriage for rotatably mounting a disc-film, a shaft associated with said casing transmitting rectilinear motion to said carriage, a spiral thread upon said shaft, and a prong slidably mounted upon said casing adapted to engage with the spiral thread to give the carriage reverse rectilinear motion, in combination with means for automatically locking said prong out of engagement with the spiral thread, means for releasing said locking means, and means upon said shaft for automatically throwing the prong out of engagement with the spiral thread.

6. In a motion picture apparatus, a casing, a carriage for rotatably supporting a disc-film, means adapted to impart rotary motion to said disc film, and a shaft constrained for rotary motion and rectilinear motion in the direction of its axis by said casing together with a train of gears and a rack for imparting rectilinear motion to said carriage, in combination with a helical tooth upon said shaft, and a prong upon said casing adapted to coact with said helical tooth for reversing the rectilinear motion of said carriage without reversing the direction of rotation of said shaft.

7. In a motion picture apparatus, a casing, a carriage mounted within said casing for rotatably supporting a disc film, a driving sleeve journalled within said casing, a shaft having slidable connection with said driving sleeve, a train of gears driven by said shaft, and a rack for imparting forward rectilinear motion to said carriage, in combination with a helical tooth upon said shaft, means upon said casing adapted to coact with said helical tooth for reversing the rectilinear motion of said carriage without reversing the direction of rotation of said shaft, and means for disconnecting said train of gears when said reversing means coacts with said helical tooth.

In testimony whereof I have signed my name to this specification.

LESTER W. BOWEN.